United States Patent
Li et al.

[11] Patent Number: 6,152,249
[45] Date of Patent: Nov. 28, 2000

[54] ELECTRIC POWER-ASSISTED BICYCLE

[75] Inventors: Ke Mei Li; Wen Shi Wang; Bin Li; Qing Zhu, all of Beijing, China

[73] Assignee: Beijing CTKM Harmonic Drive Co., Ltd., Beijing, China

[21] Appl. No.: 09/199,585

[22] Filed: Nov. 25, 1998

[30] Foreign Application Priority Data

Nov. 25, 1997 [CN] China ............................ 97 2 49595

[51] Int. Cl.[7] .................................................. B62K 11/00
[52] U.S. Cl. .......................................... 180/205; 180/220
[58] Field of Search ................................... 180/205, 206, 180/207, 220; 310/67 A, 67 R

[56] References Cited

U.S. PATENT DOCUMENTS

| | | | |
|---|---|---|---|
| 4,626,727 | 12/1986 | Janson | 310/156 |
| 4,819,975 | 4/1989 | Morishita et al. | 290/48 |
| 4,840,090 | 6/1989 | Iwata | 74/804 |
| 4,871,042 | 10/1989 | Hsu et al. | 180/220 |
| 5,570,752 | 11/1996 | Takata | 180/206 |
| 5,698,919 | 12/1997 | Obara | 310/90 |
| 5,900,703 | 5/1999 | Li | 318/2 |
| 6,002,192 | 12/1999 | Krivospitski et al. | 310/266 |
| 6,011,337 | 1/2000 | Lin et al. | 310/156 |
| 6,012,538 | 1/2000 | Sonobe et al. | 180/220 |

OTHER PUBLICATIONS

McGraw–Hill Encyclopedia of Engineering, Harmonic Speed Changer, p. 518–519, Copyright 1993.

*Primary Examiner*—Kevin Hurley
*Assistant Examiner*—Andrew J. Fischer
*Attorney, Agent, or Firm*—Cohen, Pontani, Lieberman & Pavane

[57] ABSTRACT

A kind of electric power-assisted bicycle is presented in the invention. Its characters consist in that: the electric-driving device 2 is composed of the flat motor installed in the shell and harmonic reducer; the shell body and storage battery are fixed in the middle of the frame; its center shaft crosses the flat motor and the harmonic reducer along with the axis line separately, and can rotate relatively to them; the mentioned flat motor is connected with the power-transmitting device through the harmonic reducer. The entire bicycle is light-weight and long-life, while it is also energy saving high efficient and can be conveniently assembled, used, carried and maintained.

11 Claims, 6 Drawing Sheets

ELECTRIC POWER-ASSISTED BICYCLE

FIELD OF THE INVENTION

The present invention relates to a kind of electric-driving vehicle, and more particularly to a bicycle driven by a motor.

BACKGROUND OF THE INVENTION

An electric or electric power-assisted bicycle is welcomed as a kind of new transport tool to replace walking. However, the electric wheel hub installed on its front and rear wheels directly drives most of current electric power-assisted bicycles. The drawbacks of this structure are listed as follows.

Firstly, the wheel hub equipped with motor and reducer increases the weight of the front or rear wheel, which affect the positions of gravity center, stability and wheel structure designed for the common bicycle.

Secondly, the ratio of the reducer in wheel hub can not be adjusted, while the speed regulation mode of common bicycle is not available for electric bicycle. Then its motor has to run at low speed to regulate the speed, which will not release the full power of the motor; it is not perfect in the whole structure and human engineering design, also in the assembling, using, maintaining and so on.

Furthermore, though they are installed near the center shaft, the bicycle is also discommodes to carry due to the weight and volume of common motor and gear reducer.

In view of the deficiencies of the structure of the prior art of an electric or electric power-assisted bicycle, it is thus an object to provide a kind of electric or electric power-assisted bicycle, which basically keeps the structure and the position of gravity center of common bicycle. It's electric-driving device having small volume, lightweight and high-speed ratio, while it is also energy saving, high efficient and can be conveniently assembled, used and maintained.

SUMMARY OF THE INVENTION

In order to achieve the above objects, the present invention provides an electric power-assisted bicycle, comprising a bicycle frame, at least two wheels, a manual-driving device, an electric-driving device, a power-transmitting device and battery, the manual-driving device and the electric-driving device being connected and being mounted on the bicycle frame between the two wheels together with the battery, wherein the electric-driving device being installed in a shell is composed of a flat motor, a harmonic reducer, bearings, seal components and fasteners, the shell is fixed on the bicycle frame;

a spin axis of the flat motor and the harmonic reducer is simultaneously identical with the center shaft of the manual-driving device, which can cross the hollow flat motor, the harmonic reducer and the power-transmitting device along with the axis line and rotate relatively to the flat motor and the harmonic reducer; and the flat motor is connected with a rear power-transmitting device through the harmonic reducer.

An electric power-assisted bicycle according to the present invention, wherein the shell is composed of a front-end cover, a cover shell, a rear end cover and a retainer ring;

the front-end cover and the rear end cover is connected immovably with the cover shell;

the cover shell is connected immovably with the exterior cover of the harmonic reducer;

the seal ring is fixed on the inner retainer ring which connecting with the exterior cover of the harmonic reducer;

the flat motor is composed of a hollow shaft, a front yoke plate, a magnetic steel, a flat armature rotor, a rear yoke plate, a electric brush and a holder, the hollow shaft being supported by a motor end cover or the bearings installed thereon and a rear motor end cover, the holder being fixed over said hollow shaft, the flat armature rotor being fixed on the holder;

the harmonic reducer consists of a circular spline, a flexspline, a wave generator and a power-output component, the circular spline being fixed on the exterior cover of the harmonic reducer, the wave generator being connected with the hollow shaft by key, the flexspline being connected immovably with the power-output component sustained by the bearings and the exterior cover of the harmonic reducer;

the center shaft with shoulder is sustained by at least two groups of bearing and crosses the axial line of the hollow shaft and the power-output component separately;

the power-output component is connected with the mentioned rear power-transmitting device.

An electric power-assisted bicycle according to the present invention, wherein the shell is composed of a motor end cover, a cover shell, a rear end cover and a plate body, the motor end cover and the rear end cover being connected immovably with the cover shell, the cover shell being connected immovably with the exterior cover of the harmonic reducer;

the flat motor is composed of the hollow shaft, a rotor field spider, a magnetic steel, a disc armature winding, a coiled magnetic-inductive iron core and a sensor, the hollow shaft being supported by the motor end cover or the bearings installed thereon and the rear motor end cover; the rotor field spider being fixed over the hollow shaft; the steel being fixed on the rotor field spider; the disc armature winding and the coiled magnetic-inductive iron core being symmetrically installed on the one or two sides of the magnetic steel;

the harmonic reducer consists of a circular spline, a flexspline, a wave generator and a power-output component, the circular spline being fixed on the exterior cover of the harmonic reducer, the wave generator being connected with the hollow shaft by key, the flexspline being connected immovably with the power-output component sustained by the bearings and the exterior cover of the harmonic reducer, the seal ring being fixed between the exterior cover of the harmonic reducer and the power-output component;

the center shaft with shoulder is sustained by at least two groups of bearing and crosses the axial line of the hollow shaft and the power-output component separately;

the power-output component is connected with the rear power-transmitting device.

An electric power-assisted bicycle according to the present invention, wherein the rotor of the flat motor can be a printed winding rotor or a disc line winding rotor.

An electric power-assisted bicycle according the present invention, wherein the disc armature winding can be a printed winding or a line winding.

An electric power-assisted bicycle according the present invention, wherein a driving mode control and display device which can also monitor and protect the operation of the power-driving device or the battery is provided on the bicycle frame.

An electric power-assisted bicycle according the present invention, wherein the battery is a portable charging storage battery.

An electric power-assisted bicycle according to the present invention, wherein two wheels is provided;

the battery is provided between the vertical pipe of the bicycle frame with a saddle and the rear wheel;

the manual-driving and the electric-driving devices are installed in the middle of the bottom of the V style shelf of the bicycle frame.

An electric power-assisted bicycle according to the present invention, wherein the flexspline can be the cap or ring body with straight-line or curve as the generating line.

An electric power-assisted bicycle according to the present invention, wherein the rear power-transmitting device is composed of a plate body, a overrunning coupler and a chain plate, the plate body being connected with the center shaft by key, the overrunning coupler being threaded and coupled with the power-output component, the plate body and the overrunning coupler being provided in together.

An electric power-assisted bicycle according to the present invention, wherein the rear power-transmitting device is composed of the plate body, two groups of overrunning coupler and a chain plate, the plate body being connected with the center shaft through a key and one group of the overrunning coupler, the other group of the overrunning coupler being threaded and coupled with the power-output component, the plate body and the overrunning coupler being provided in together.

Due to above structure, the invention has the following advantages:

1. Since its gravity center is near the center shaft according to common bicycle, the performances of dynamics, riding and stability are improved, and the bicycle is also convenient to part and carry.

2. The power-driving device lies at the center shaft. The front and rear wheels do not need changing. The speed can be regulated with various speed-regulating devices of common bicycle according to the different riding state. Thereby, the motor will run under the best condition, and it is also advantaged for the consumption of battery.

3. Adopting the high-tech, high-efficient and long-life hollow shaft printed motor with brush or no brush and harmonic reducer, the electric driving device has small volume, lightweight, small rotary inertia and high response speed. It can save energy and regulate the speed accurately.

4. Installing the intelligent computer control device, the storage battery and the state of motor can be monitored and protected to automatically adjust the output of rider and the motor and the electric current of storage battery. Thereby, the life of motor and storage battery are increased. The bicycle will have the higher reliability, longer life and be more convenient to ride.

5. According to the practical requirements, it is convenient to realize the manual-driving, electric power-assisted driving and full electric driving by selecting different transmitting device.

BRIEF DESCRIPTION OF THE DRAWINGS

The present invention will become more apparent as the disclosure of the present invention is made with reference to the accompanying drawings wherein.

DETAILED DESCRIPTION OF PREFERRED EMBODIMENTS

Figure 1:
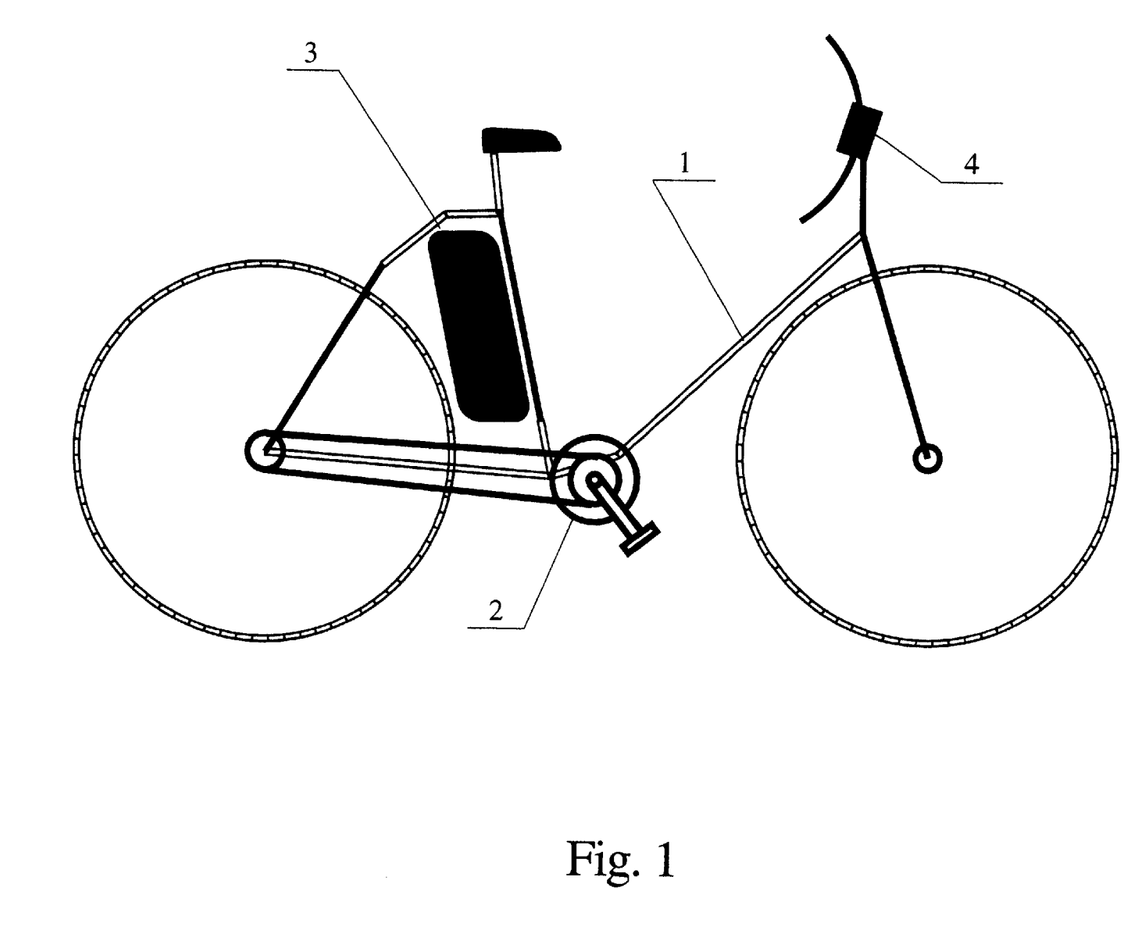
FIG. 1 is the sketch of an electric power-assisted bicycle according to the present invention.

The electric power-assisted bicycle in FIG. 1 is composed of bicycle frame 1, two wheels, pedal device, electric driving device 2, storage battery 3, chain and other driving devices. The storage battery 3 is detachable and is installed between the vertical pipe of the bicycle frame 1 with a saddle and the rear wheel. The pedal device and electric driving device 2 are installed in the middle of the bottom of the V style shelf of the bicycle frame 1. The driving mode control and display device 4 is installed on the handle bar to monitor the running state and protect the power-driving device 2 and battery 3. The bicycle adopts the standard components of common bicycle except the power driving and transmitting devices. The bicycle body adopts the aluminum alloy material.

Figure 2:
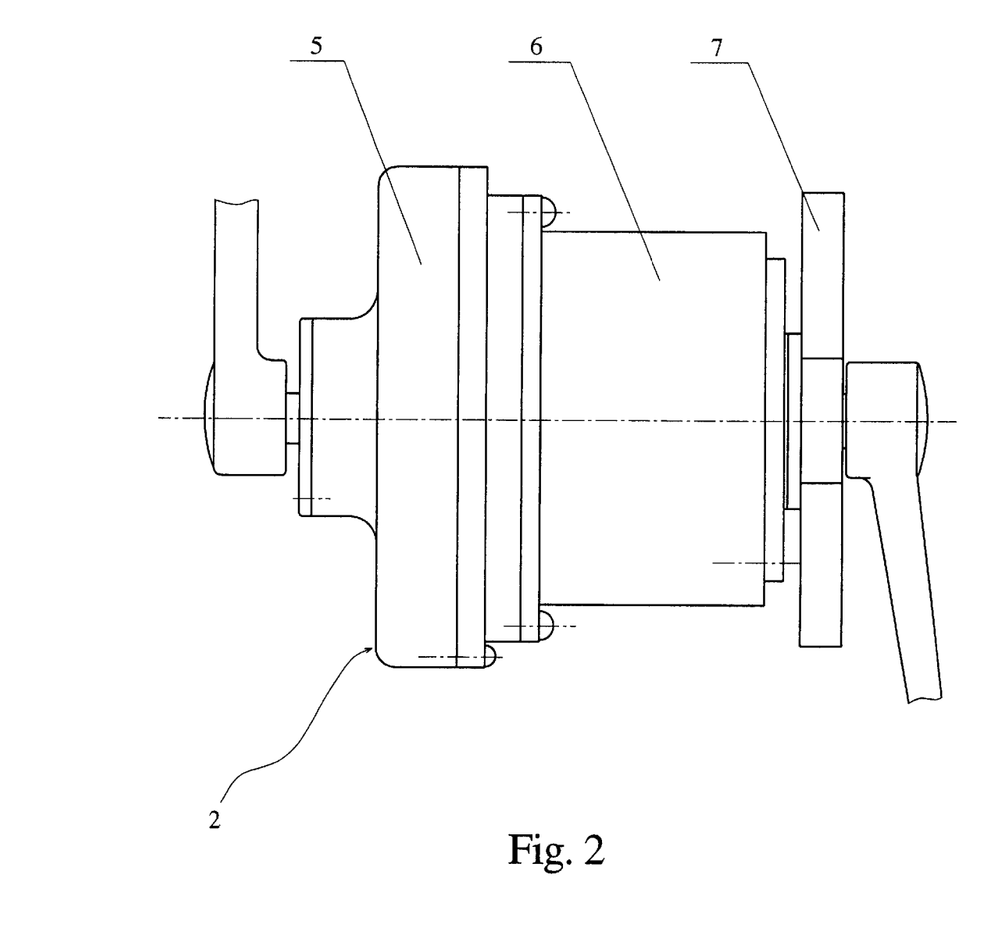
FIG. 2 is the connected structure sketch of an electric-driving and power-transmitting device according to an embodiment of the present invention.
Figure 3:
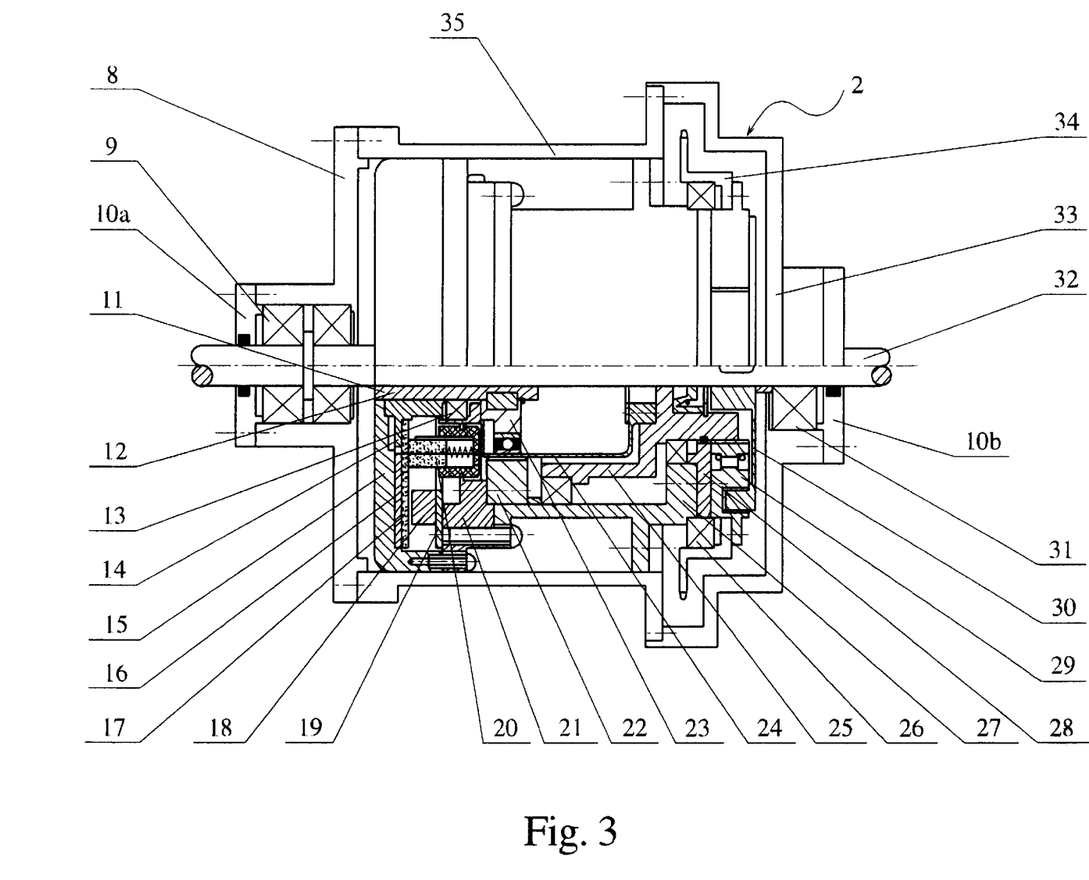
FIG. 3 is the cross-sectional view of the assembling structure of a power-assisted driving device in FIG. 2.

In FIGS. 2 and 3, electric-driving device 2 is composed of flat motor 5, harmonic reducer 6, five groups of bearing, three groups of seal components and screws. The shell is composed of front-end cover 8, rear end cover 33, exterior cover of the harmonic reducer 27, front bearing gland cover 10a and rear bearing gland cover 10b. The front-end cover 8 and the rear end cover 33 are connected immovably with the cover shell 35 by screws. The cover shell 35 is connected immovably with the exterior cover of the harmonic reducer 27 by screws. The exterior cover of the harmonic reducer 27 is connected with the bearing retainer ring 28. The seal ring is fixed on the bearing retainer ring 28. The flat motor is composed of hollow shaft 12, front yoke plate 16, magnetic steel 18, flat armature rotor 17, rear yoke plate 19, electric brush 20 and holder 14. The hollow shaft 12 is supported by the bearings 13 installed on motor end cover 15 and the rear motor end cover 21. The holder 14 is fixed over the hollow shaft 12 by screws. The flat armature rotor 17 is fixed on the holder 14 by screws. The front yoke plate 16 is fixed on the motor end cover 15. The magnetic steel 18 is fixed on the rear yoke plate 19. The rear yoke 19, the electric brush 20 and etc. are fixed on the rear motor end cover 21 separately. The harmonic reducer 6 consists of circular spline 22, cap flexspline 24, wave generator 23 and power-output component 25. The circular spline 22 is fixed on the rear motor end cover 21 and exterior cover of harmonic reducer 27. The wave generator 23 is connected with the hollow shaft 12 by key. One end of cap flexspline 24 is installed between the circular spline 22 and wave generator 23, the other end is connected immovably by screws with the power-output component 25 sustained by the bearings installed on the exterior cover of the harmonic reducer 27. The shoulder center shaft 32 is sustained by three groups of bearing 9 and 31 installed on the front end cover 8 and the rear end cover 33 separately. The center shaft 32 crosses the center of the front bearing gland cover 10a with seal component, rear bearing gland cover 10b, cap flexspline 24 and power-output component 25 separately. There is gap between the center shaft 32 and hollow shaft 12, and between the cap flexspline 24 and power-output component 25. The power-transmitting device 7 is composed of plate body 30, overrunning coupler 29 and chain plate 34. The plate body 30 is connected with the center shaft 32 by key. The overrunning coupler 29 is threaded and coupled with the power-output component 25 and connected with chain plate 34 by screws. The plate body 30 and the overrunning coupler 29 are built in together. A sustaining bearing 26 is mounted under the chain plate 34.

Figure 4:
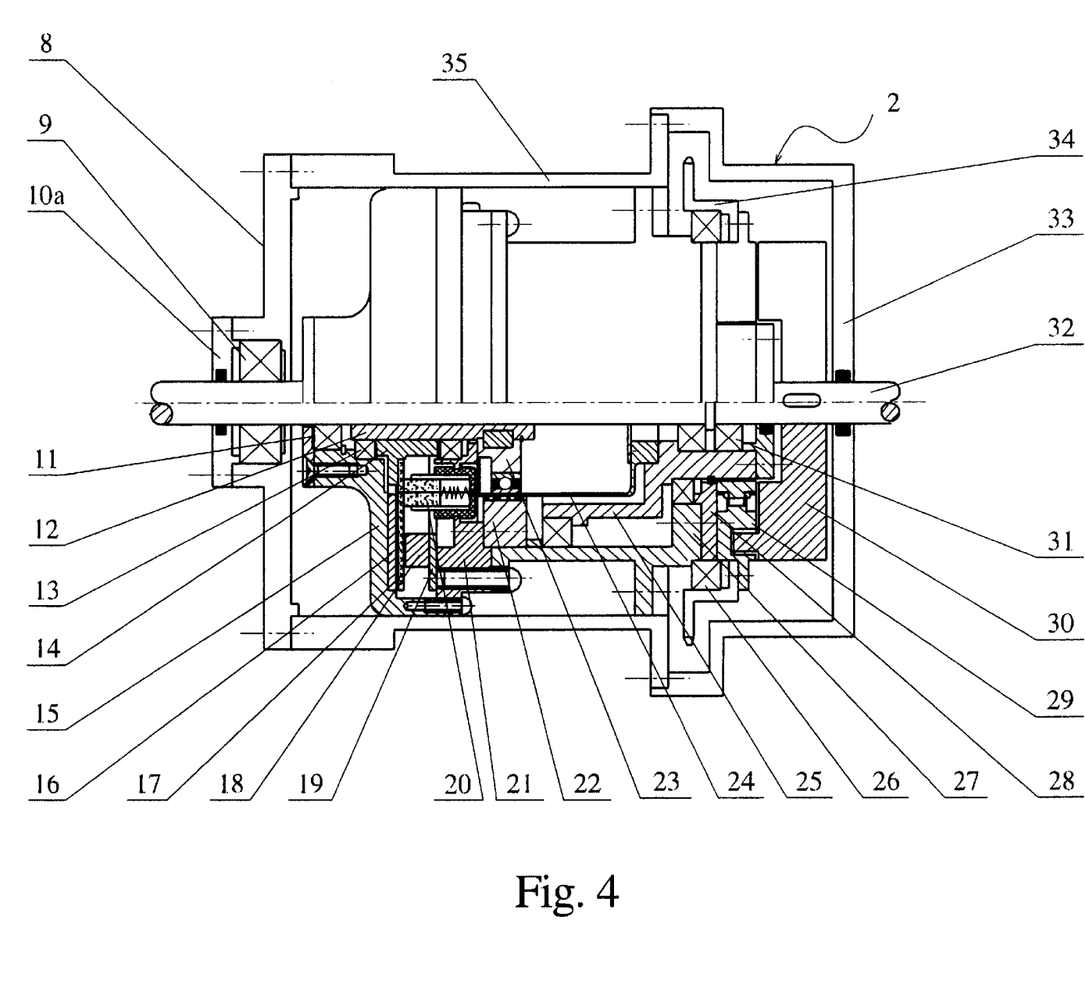
FIG. 4 is the cross-sectional view of the assembling structure of another power-assisted driving device in FIG. 2.

The main different between FIGS. 3 and 4 consists in that the center shaft 32 is sustained by two groups of bearing 31 installed on the power-output component 25, a group of bearing 9 installed on the front end cover 8 and the bearing 11 installed on motor front 15 end cover, and that the hollow shaft 12 is sustained by the bearing 11 installed on the motor front end cover 15 and motor rear end cover 21. Additionally, a bearing retainer ring is installed on the motor front-end cover 15.

Figure 5:
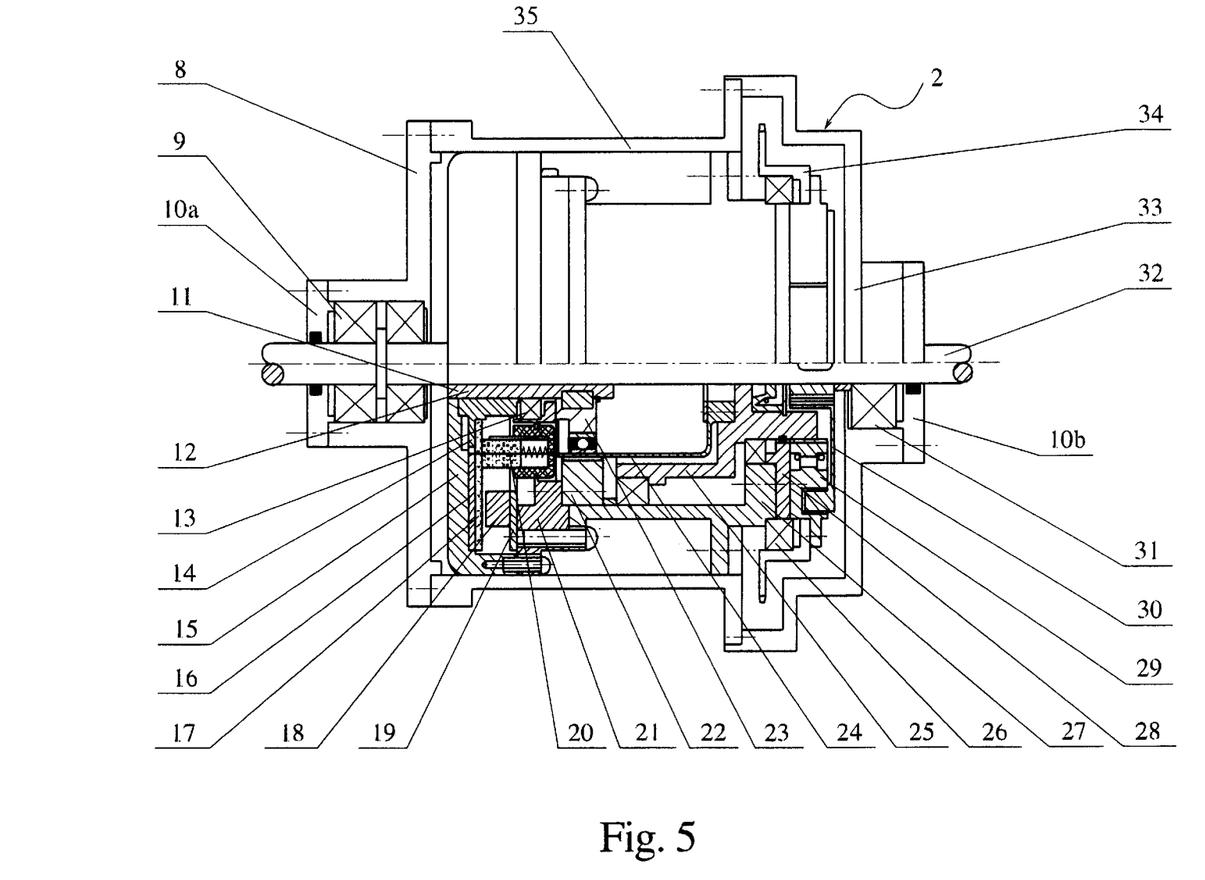
FIG. 5 is the cross-sectional view of the assembling structure of a full electric-driving device in FIG. 2.

In order to achieve the full electric driving, the power-transmitting device in FIG. 5 is adjusted accordingly. Another overrunning coupler 29' is installed between keys connecting the plate body 30 and center shaft 32. The rest structure is same as above structure.

In above implementation example, the flat armature rotor can adopt printed winding rotor or disc line winding rotor. Furthermore, other ring flexsplines taking curve as generating line can be adopted to improve the reliability of harmonic reducer.

Figure 6:
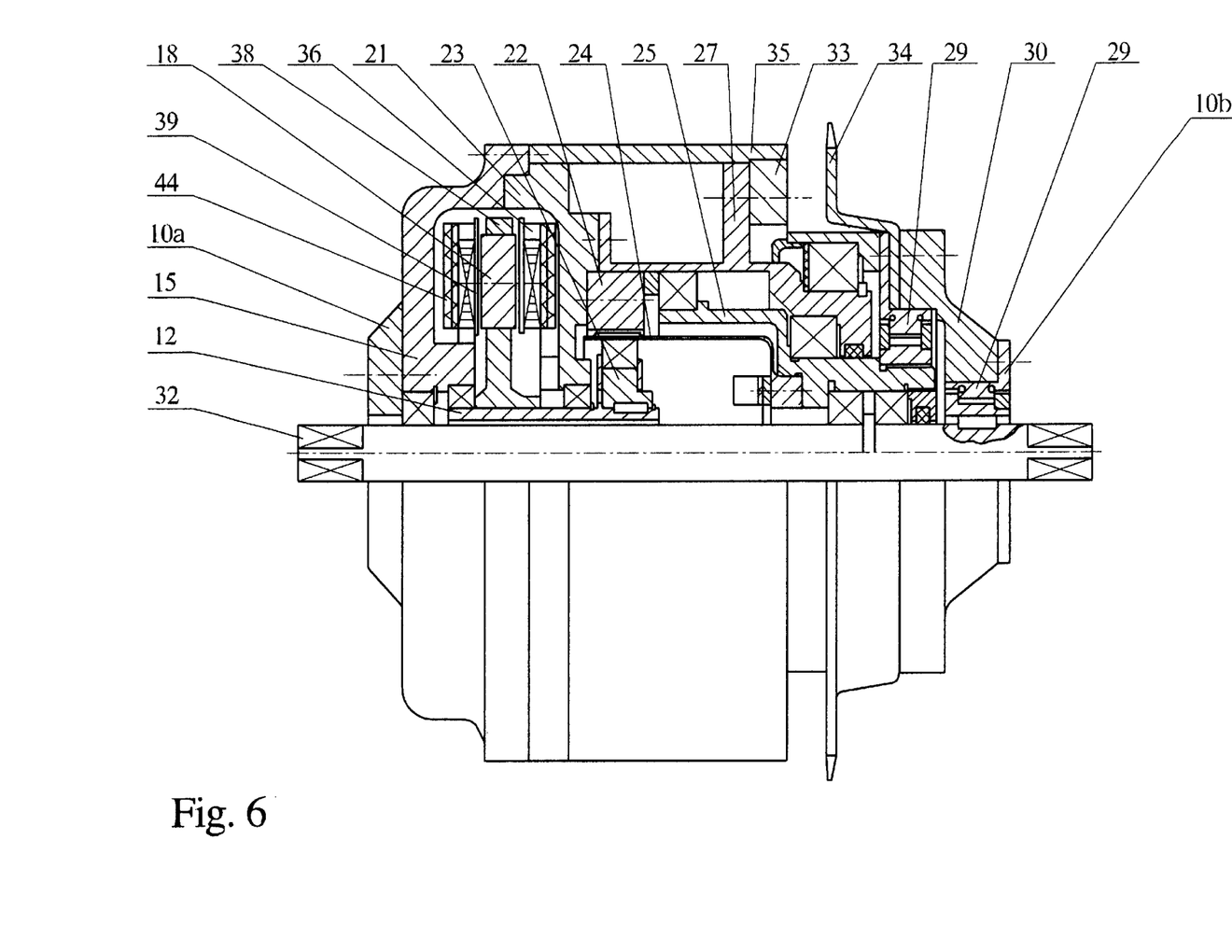
FIG. 6 shows the driving and power-transmitting device of the electric power-assisted bicycle according to another embodiment of the present invention.

Other flat motors can be also adopted in this invention. In FIG. 6, the disc motor without brush is adopted as the motor driving device. The main different from the structure in FIG. 3 or 4 consists in that the driving device's shell is composed of front bearing gland cover 10a, motor end cover 15, cover shell 35, rear end cover 33, plate body 30 and rear bearing gland cover 10b. The front-end cover 15 and rear end cover 33 are connected with cover shell 35 by screw bolts. The cover shell 35 is connected immovably with the exterior cover of harmonic reducer 27 by the rear end cover 33. The disc winding motor without brush is composed of hollow shaft 12, rotor field spider 38, magnetic steel 18, disc armature winding 44, coiled magnetic-inductive iron core 36 and sensor 39. The hollow shaft 12 is supported by or two groups of bearings installed on the motor end cover 15 and the rear motor end cover 21. The rotor field spider 38 is fixed over the hollow shaft 12. The magnetic steel 18 is mounted on the rotor field spider 38. The disc armature winding 44 and coiled magnetic-inductive iron core 36 are symmetrically installed on the two sides of the magnetic steel 18. Moreover, the center shaft 32 is sustained by three groups of bearing. Two of them limit the axial movement of the center shaft 32 by the shoulder on the center shaft 32. At the same time, they sustain and fix the power-output component 25. Two groups of bearing and a seal ring are also installed between the power-output component 25 and exterior cover of the harmonic reducer 27. The power-output component 25 is threaded and coupled with the overrunning coupler 29. The overrunning coupler 29 and chain plate 34 are connected with the plate body 30 and rear end cover 33. The overrunning coupler 29' connected the center shaft 32 with the plate body 30 through key. In this scheme, the disc armature can be replaced by the line winding one and be installed on one side of the magnetic steel 18. The serious and parallel connection can be adopted in the circuit design. The sensor 39 is put outside the magnetic steel 18. The rotor field spider is made from non-magnetic-inductive material.

In this implementation example, the storage battery 3 adopts the portable charging nickel-hydrogen battery or nickel-cadmium battery.

In this implementation example, an intelligent computer control device is also equipped which has been generally applied in the control and protection of motor and storage battery at present. It can monitor and protect the running state of motor and storage battery, automatically regulate the output force of human and motor as well as the storage battery current, shut down the power supply before breaking and adapt the requirement for the start-stop with high frequency. Moreover, the different power-transmitting devices can be selected to realize the manual driving, electric power-assisted driving and full electric driving according to the practical requirements.

The electric power-assisted bicycle presented in this invention basically keeps the original structure and the position of gravity center of common bicycle. The design accords with the requirements of structural mechanics and human engineering. The various speed regulation advantages of common bicycle are fully utilized to improve the working life of the motor and storage battery. It is convenient to ride and maintain with a high reliability and long life. Especially, the electric-driving device has small volume, lightweight and high-speed ratio, while it is also energy saving, high efficient and can be conveniently assembled, used, carried and maintained.

What is claimed is:

1. A centrally-arranged co-axial electric power-assisted bicycle, comprising:
    a V-shaped frame having a vertical post with an upper end and a lower end and an inclined post with an upper end and a lower end, wherein said lower ends are connected at a connection point to form said V-shaped frame;
    a manual-driving device having a central shaft rotatable about an axis of rotation;
    a flat motor comprising a hollow central shaft, wherein said central shaft of said manual-driving device is inserted through said hollow central shaft and said hollow central shaft is rotatable about said axis of rotation, said motor comprising a flat disc-shaped rotor which is substantially perpendicular to said axis of rotation such that a magnetic field of said motor is substantially parallel with the direction of said axis of rotation;
    a battery mounted on said frame operatively connected for supplying electric power to said motor;
    a cup-shaped flexspline harmonic reducer operatively arranged for rotation about said axis of rotation, said cup-shaped flexspline harmonic reducer comprising a wave generator connected for rotation with said hollow central shaft, a power output device, and an exterior cover;
    a rear-power transmitting device arranged for rotation about said axis of rotation and coupled with said power-output device of said harmonic reducer; and
    a shell in which said motor, said harmonic reducer, and said bearing are arranged, wherein a center of weight of each rotational element of said motor, said harmonic reducer, and said rear-power transmitting device is on said axis of rotation.

2. An electric power-assisted bicycle according to claim 1, wherein said shell comprises a front end cover (8), a cover shell (35), a rear end cover (33), said front-end cover (8) and said rear end cover (33) are connected immovably with said cover shell (35), and said cover shell (35) is connected immovably with the exterior cover of the harmonic reducer (27);

wherein a bearing sealing ring is connected to the exterior cover of the harmonic reducer and a seal ring is fixed between the power-output component (25) and the bearing retainer ring in a seal slot of the bearing retainer ring (28);

wherein said flat disc-shaped rotor of said flat motor comprises a flat armature rotor and said flat motor (5) comprises a front yoke plate (16), a magnetic steel (18), a rear yoke plate (19), and electric brush (20) and a holder (14), said hollow shaft (12) being supported by a motor end cover (15) or the bearings installed thereon and a rear motor end cover (21), said holder (14) being fixed over said hollow shaft (12), said flat armature rotor (17) being fixed on said holder (14);

wherein said harmonic reducer (6) further comprises a circular spline (22) and a flexspline (24), said circular spline (22) being fixed on said exterior cover of the harmonic reducer (27), said wave generator (23) being connected with said hollow shaft (12) by key, said flexspline (24) being connected immovably with said power-output component (25) sustained by said bearings and the exterior cover of the harmonic reducer (27); and wherein said central shaft (32) comprises a shoulder and is sustained by at least two groups of bearing and crosses the axial line of said hollow shaft (12) and said power-output component (25) separately.

3. An electric power-assisted bicycle according to claim 1, wherein said shell comprises a motor end cover (15), a cover shell (35), a rear end cover (33) and a plate body (30), said motor end cover (15) and said rear end cover (33) being connected immovably with said cover shell (35), said cover shell (35) being connected immovably with said exterior cover of the harmonic reducer (27);

wherein said flat disc-shaped rotor of said flat motor comprises a rotor field spider and a magnetic steel mounted on said rotor field spider and said flat motor (5) further comprises a disk armature winding (44), a coiled magnetic-inductive iron core (36) and a sensor (39), said hollow shaft (12) being supported by the motor end cover (15) or the bearings installed thereon and said rear motor end cover (21); said rotor field spider (38) being fixed over said hollow shaft (12); said steel (18) being fixed on said rotor field spider (38); said disc armature winding (44) and said coiled magnetic-inductive iron core (36) being symetrically installed on the one or two sides of said magnetic steel (18);

wherein said harmonic reducer (6) further comprises a circular spline (22) and a flexspline (24), said circular spline (22) being fixed on said exterior cover of the harmonic reducer (27), said wave generator (23) being connected with said hollow shaft (12) by key, said flexspline (24) being connected immovably with said power-output component (25) sustained by said bearings and said exterior cover of the harmonic reducer (27);

wherein a bearing sealing ring is connected to the exterior cover of the harmonic reducer and a seal ring is fixed between said exterior cover of the harmonic reducer (27) and said power-output component (25) in a seal slot of the bearing retainer ring (28); and wherein said central shaft (32) comprises a shoulder and is sustained by at least two groups of bearing and crosses the axial line of said hollow shaft (12) and said power-output component (25) separately.

4. An electric power-assisted bicycle according to claim 2, wherein said rotor of said flat motor (5) comprises one of a printed winding rotor and a disc line winding rotor.

5. An electric power-assisted bicycle according to claim 3, wherein said disc armature winding comprises one of a printed winding and a line winding.

6. An electric power-assisted bicycle according to any one of claims 1, 2, and 3, further comprising a driving mode control and display device comprising means for monitoring and protecting the operation of said power-driving device or said battery arranged on the bicycle frame.

7. An electric power-assisted bicycle according to any one of claims 1, 2, and 3, wherein said battery is a portable charging storage battery.

8. An electric power-assisted bicycle according to any one of claims 1, 2, and 3, further comprising two wheels arranged on said bicycle frame, wherein said battery (3) is provided between the vertical pipe of said bicycle frame (1) with a saddle and the rear wheel; and said manual-driving and said electric-driving devices are installed proximate said connection point of said vertical post and said inclined post.

9. An electric power-assisted bicycle according to claim 2 or 3, wherein said rear power-transmitting device (7) comprises a plate body (30), a overrunning coupler (29) and a chain plate (34), said plate body (30) being connected with said central shaft (32) by key, said overrunning coupler (29) being threaded and coupled with said power-output component (25), and said overrunning coupler (29) being mounted in said plate body (30).

10. A centrally-arranged co-axial electric power-assisted bicycle, comprising:

a V-shaped frame having a vertical post with an upper end and a lower end and an inclined post with an upper end and a lower end, wherein said lower ends are connected at a connection point to form said V-shaped frame;

a manual-driving device having a central shaft rotatable about an axis of rotation;

a motor comprising a hollow central shaft, wherein said central shaft of said manual-driving device is inserted through said hollow central shaft and said hollow central shaft is rotatable about said axis of rotation, said motor comprising a flat disc-shaped armature rotor which is substantially perpendicular to said axis of rotation and wherein a magnetic field of said motor is substantially parallel with the direction of said axis of rotation;

a battery mounted on said frame operatively connected for supplying electric power to said motor;

a cup-shaped flexspline harmonic reducer having an exterior cover and operatively arranged for rotation about said axis of rotation, said cup-shaped flexspline harmonic reducer comprising a wave generator connected for rotation with said hollow central shaft and a power output device;

a rear-power transmitting device arranged for rotation about said axis of rotation and comprising a plate body, two groups of overrunning couplers and a chain plate, said plate body being connected with said central shaft of said manual-driving device through a key and one group of said overrunning couplers, the other group of said overrunning couplers being threaded, coupled with said power-output component, and mounted in said plate body; and a shell in which said motor, said harmonic reducer, and said bearing are arranged, wherein a center of weight of each rotational element of said motor, said harmonic reducer, and said rear-power transmitting device is on said axis of rotation, wherein said shell comprises a cover shell fixedly connected to said exterior cover of said harmonic reducer, a front end cover and a rear end cover fixedly connected to said cover shell, and a seal ring fixed in a seal slot on a bearing retaining ring on the exterior cover of the harmonic reducer;

said motor further comprising a front yoke plate, a magnetic steel, a rear yoke plate, and electric brush and a holder, said hollow shaft being supported by a motor end cover or bearings installed thereon and a rear motor end cover, said holder being fixed over said hollow shaft, and said flat armature rotor being fixed on said holder;

said harmonic reducer further comprising a circular spline and a flexspline, wherein said circular spline is fixed on said exterior cover of the harmonic reducer, said wave generator is connected with said hollow shaft by key, and said flexspline is connected immovably with said power-output component sustained by said bearings and the exterior cover of the harmonic reducer; and said central shaft comprises a shoulder and is sustained by at least two groups of bearing and crosses the axial line of said hollow shaft and said power-output component separately.

11. A centrally-arranged co-axial electric power-assisted bicycle, comprising:

a V-shaped frame having a vertical post with an upper end and a lower end and an inclined post with an upper end and a lower end, wherein said lower ends are connected at a connection point to form said V-shaped frame;

a manual-driving device having a central shaft rotatable about an axis of rotation;

a motor comprising a hollow central shaft, wherein said central shaft of said manual-driving device is inserted through said hollow central shaft and said hollow central shaft is rotatable about said axis of rotation, said motor comprising a flat disc-shaped rotor which is substantially perpendicular to said axis of rotation and wherein a magnetic field of said motor is substantially parallel with the direction of said axis of rotation, said flat disc-shaped rotor comprising a rotor field spider and a magnetic steel mounted thereon;

a battery mounted on said frame operatively connected for supplying electric power to said motor;

a cup-shaped flexspline harmonic reducer operatively arranged for rotation about said axis of rotation, said cup-shaped flexspline harmonic reducer comprising a wave generator connected for rotation with said hollow central shaft and a power output device;

a rear-power transmitting device arranged for rotation about said axis of rotation and comprising a plate body, two groups of overrunning couplers, and a chain plate, said plate body being connected with said central shaft of said manual-driving device through a key and one group of said overrunning couplers, the other group of said overrunning couplers being threaded, coupled with said power-output component, and mounted in said plate body; and a shell in which said motor, said harmonic reducer, and said bearing are arranged, comprises a cover shell fixedly connected to said exterior cover of said harmonic reducer, a motor end cover and a rear end cover fixedly connected to said cover shell, a seal ring fixed in a seal slot on an inner retaining ring on the exterior cover of the harmonic reducer, wherein a center of weight of each rotational element of said motor, said harmonic reducer, and said rear-power transmitting device is arranged on said axis of rotation;

said motor further comprising a disc armature winding, a coiled magnetic-inductive iron core and a sensor, said hollow shaft being supported by said motor end cover or the bearings installed thereon and said rear motor end cover, said rotor field spider being fixed over said hollow shaft, said disc armature winding and said coiled magnetic-inductive iron core being symmetrically installed on one or two axial sides of said magnetic steel;

said harmonic reducer further comprising a circular spline and a flexspline, wherein said circular spline is fixed on said exterior cover of the harmonic reducer, said wave generator is connected with said hollow shaft by key, and said flexspline is connected immovably with said power-output component sustained by said bearings and the exterior cover of the harmonic reducer; and said central shaft comprises a shoulder and is sustained by at least two groups of bearing and crosses the axial line of said hollow shaft and said power-output component separately.

* * * * *